US009436869B2

(12) United States Patent
Kim et al.

(10) Patent No.: US 9,436,869 B2
(45) Date of Patent: Sep. 6, 2016

(54) METHOD AND APPARATUS FOR ACQUIRING NERVE FIBER STRUCTURE INFORMATION OF OBJECT BY USING MRI SYSTEM

(71) Applicants: SAMSUNG ELECTRONICS CO., LTD., Suwon-si (KR); Industry-University Cooperation Foundation Hanyang University, Seoul (KR)

(72) Inventors: Hei-soog Kim, Anyang-si (KR); Jong-min Lee, Seoul (KR); Hun-ki Kwon, Seoul (KR); Hyug-rae Cho, Seoul (KR)

(73) Assignees: SAMSUNG ELECTRONICS CO., LTD., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 119 days.

(21) Appl. No.: 14/033,627

(22) Filed: Sep. 23, 2013

(65) Prior Publication Data
US 2014/0233819 A1     Aug. 21, 2014

(30) Foreign Application Priority Data
Feb. 20, 2013   (KR) ................. 10-2013-0018243

(51) Int. Cl.
*G06K 9/00*  (2006.01)
*G06T 7/00*  (2006.01)

(52) U.S. Cl.
CPC ......... *G06K 9/00201* (2013.01); *G06T 7/0081* (2013.01); *G06T 2200/04* (2013.01); *G06T 2207/10092* (2013.01); *G06T 2207/30016* (2013.01)

(58) Field of Classification Search
CPC .............................. G06T 2207/10092
See application file for complete search history.

(56) References Cited

U.S. PATENT DOCUMENTS

| 6,526,305 B1 * | 2/2003 | Mori ............... G01R 33/56341 |
| | | 128/920 |
| 7,627,155 B2 * | 12/2009 | Guo et al. .................... 382/128 |

(Continued)

FOREIGN PATENT DOCUMENTS

| JP | 2004-81657 A | 3/2004 |
| JP | 2006-524088 A | 10/2006 |

(Continued)

OTHER PUBLICATIONS

Henry et al., "Subcortical pathways serving cortical language sites: initial experience with diffusion tensor imaging fiber tracking combined with intraoperative language mapping", NeuroImage 21 (2004) 616-622.*

(Continued)

*Primary Examiner* — Soo Park
(74) *Attorney, Agent, or Firm* — Sughrue Mion, PLLC

(57) ABSTRACT

A method of obtaining fiber structure information of a nerve fiber in an object by using an MRI system includes: obtaining image information of voxels of the object; setting a tracking start area including at least one voxel of the object; setting at least one voxel adjacent to the tracking start area as a tracking processing area; determining a similarity between image information of a voxel included in the set tracking processing area and a voxel included in the tracking start area; and obtaining the fiber structure information according to the determined similarity.

25 Claims, 13 Drawing Sheets

(56) References Cited

U.S. PATENT DOCUMENTS

| | | | |
|---|---|---|---|
| 8,059,879 B2* | 11/2011 | Tsukimoto | G01R 33/56341 382/131 |
| 8,447,089 B2* | 5/2013 | Liu | 382/131 |
| 8,675,001 B2* | 3/2014 | Roth | G01R 33/56341 345/519 |
| 8,913,061 B2* | 12/2014 | Chen | G06T 7/0081 345/419 |
| 2003/0214290 A1* | 11/2003 | van Muiswinkel | G01R 33/56341 324/307 |
| 2006/0241897 A1 | 10/2006 | Hoogenraad et al. | |
| 2008/0284434 A1* | 11/2008 | Wedeen | 324/309 |
| 2009/0232374 A1 | 9/2009 | Simon | |
| 2014/0357979 A1* | 12/2014 | Basser | 600/410 |

FOREIGN PATENT DOCUMENTS

| | | |
|---|---|---|
| JP | 2011-177522 A | 9/2011 |
| WO | WO 2007036859 A2 * | 4/2007 |

OTHER PUBLICATIONS

Parker et al., "Estimating distributed anatomical connectivity using fast marching methods and diffusion tensor imaging", IEEE Transactions on Medical Imaging, vol. 21, No. 5, May 2002.*

Bammer et al., "In vivo MR tractography using diffusion imaging", European Journal of Radiology 45 (2003) pp. 223-234.*

Jonasson et al., "White matter fiber tract segmentation in DT-MRI using geometric flows", Medical Image Analysis 9 (2005) 223-236.*

Staempfli et al., "Resolving fiber crossing using advanced fast marching tractography based on diffusion tensor imaging", NeuroImage 30 (2006) 110-120.*

Kreher et al., "Connecting and merging fibres: pathway extraction by combining probability maps", NeuroImage 43 (2008) 81-89.*

Basser, Peter J., et al., "MR Diffusion Tensor Spectroscopy and Imaging," Biophysical Society, Biophysical Journal, vol. 66, Jan. 1994, pp. 259-267.

Mori, Susumu, et al., "Fiber tracking: principles and strategies—a technical review," John Wiley & Sons, Ltd., NMR Biomed, vol. 15, Jan. 20, 2002, pp. 468-480.

Parker, Geoffrey J.M., et al., "Estimating Distributed Anatomical Connectivity Using Fast Marching Methods and Diffusion Tensor Imaging," IEEE, IEEE Transactions on Medical Imaging, vol. 21, No. 5, May 2002, pp. 505-512.

Zijdenbos, Alex P., et al., "Automatic "Pipeline" Analysis of 3-D MRI Data for Clinical Trials: Application to Multiple Sclerosis," IEEE, IEEE Transactions on Medical Imaging, vol. 21, No. 10, Oct. 2002, pp. 1280-1291.

Communication dated Mar. 26, 2014 issued by the Korean Intellectual Property Office in counterpart Korean Patent Application No. 10-2013-0018243.

* cited by examiner

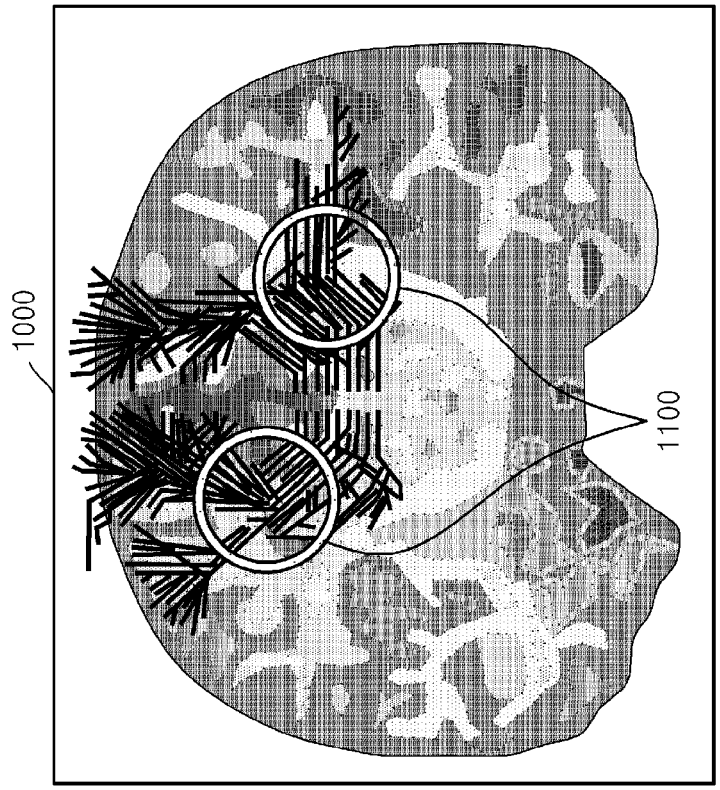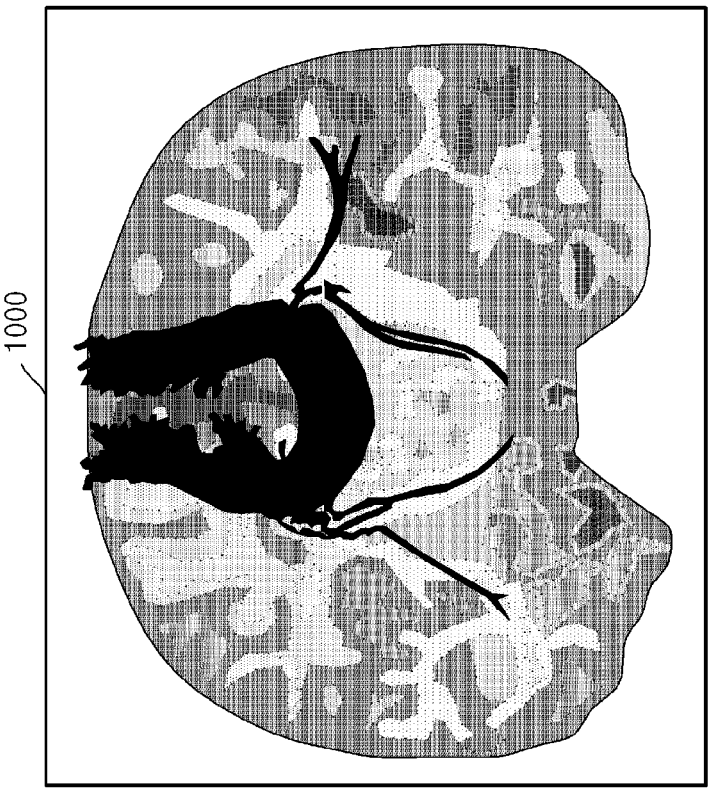
FIG. 10A (RELATED ART)
FIG. 10B

METHOD AND APPARATUS FOR ACQUIRING NERVE FIBER STRUCTURE INFORMATION OF OBJECT BY USING MRI SYSTEM

CROSS-REFERENCE TO RELATED PATENT APPLICATION

This application claims priority from Korean Patent Application No. 10-2013-0018243, filed on Feb. 20, 2013, in the Korean Intellectual Property Office, the disclosure of which is incorporated herein in its entirety by reference.

BACKGROUND

1. Field

Methods and apparatuses consistent with exemplary embodiments relate to acquiring fiber structure information of a nerve fiber in an object by using a magnetic resonance imaging (MRI) system, and more particularly, to acquiring fiber structure information of a nerve fiber in an object by setting a tracking start area and a tracking processing area for tracking an internal structure of the object, and determining the similarity between pieces of image information of voxels in the respective corresponding areas.

2. Description of the Related Art

MRI is a technique of acquiring an image of an object by disposing the object in an area where a magnetic field is generated, generating radio frequency pulses to make protons in the object resonate in order to measure a difference between signals coming out of tissue or the like included in the object, and reconstructing an image of the object via a computer.

MRI provides images of high resolution and good contrast, compared with other imaging techniques, and enables providing deep organ images and three-dimensional (3D) information. Moreover, MRI is harmless to humans because there is no radiation exposure, and an axial image, a sagittal image, a coronal image, and the like may be obtained without changing the location of an object.

Nerve fibers of white matter contained in the human brain are used as biomarkers for pathological physiology research regarding schizophrenia, strokes, dementia, etc., and also play an important role in neuroanatomy and physiological research.

A great amount of research of tracking paths of nerve fibers of white matter has been conducted based on diffusion tensors which are obtained from the voxels of brain images in a non-invasive manner. In the research of tracking the paths of nerve fibers of white matter, it is important to reduce tracking time and minimize errors that may occur during the tracking.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more of exemplary embodiments provide a method and apparatus for acquiring fiber structure information of a nerve fiber in an object by using an MRI system.

According to an aspect of an exemplary embodiment, there is provided a method of obtaining fiber structure information of a nerve fiber in an object by using an MRI system, the method including: obtaining image information of each voxel of the object; setting a tracking start area including at least one voxel of the object; setting at least one voxel adjacent to the tracking start area as a tracking processing area according to predetermined standards; determining a similarity between image information of a voxel included in the set tracking processing area and image information of a voxel included in the tracking start area; and obtaining the fiber structure information according to the determined similarity.

The obtained image information of each voxel of the object may include diffusion direction information that is obtained from diffusion tensor image (DTI) regarding the object.

The predetermined standards may include a diffusion directivity of the tracking start area, and the setting of a tracking processing area may include setting at least one voxel located along a diffusion direction of the tracking start area, as a tracking processing area.

The predetermined standards may further include a range of angles formed by the diffusion direction of the tracking start area and a diffusion direction of at least one voxel adjacent to the tracking start area.

The determining a similarity between image information of a voxel included in the set tracking processing area and image information of a voxel included in the tracking start area may include: obtaining a similarity of a diffusion direction of a voxel included in the tracking start area and a diffusion direction of a voxel in the tracking processing area, as a scalar value; and obtaining first diffusion time, as an inverse number of the predetermined scalar value, wherein the first diffusion time includes a diffusion time of a substance diffusing from a voxel of the tracking start area to a voxel for which the scalar value is obtained.

The similarity may be weighted by using at least one of white matter probability information and a fractional anisotropy (FA) value of the object, as a scalar value.

The obtaining the fiber structure information according to the determined similarity may include: resetting a tracking start area to include at least one voxel whose similarity is determined; determining a similarity of a diffusion direction of at least one voxel that is adjacent to the reset tracking start area by setting of a tracking processing area and determining a similarity between image information of a voxel included in the set tracking processing area and image information of a voxel included in the reset tracking start area; acquiring second diffusion time from the similarity determined in regard to the reset tracking start area; accumulating the first diffusion time and the second diffusion time; and acquiring diffusion time by mapping the accumulated time to a voxel for which the second diffusion time is acquired, wherein the diffusion time includes a diffusion time of a substance diffusing from an initially set tracking start area to the voxel for which the second diffusion time is acquired.

The fiber structure information may be obtained as a path for which the accumulated diffusion time indicating the diffusion time of the substance diffusing from the initially set tracking start area to each voxel is the smallest, by using the obtained diffusion time of each voxel.

According to another aspect of an exemplary embodiment, there is provided an apparatus for acquiring fiber structure information of a nerve fiber in an object by using an MRI system, the apparatus including: an image information obtainer that obtains image information of each voxel of an object; a tracking start area setter that sets a tracking start area including at least one voxel of an object; a tracking processing area setter that sets at least one voxel that is adjacent to the tracking start area, as a tracking processing area, according to predetermined standards; a similarity determiner that determines a similarity between image information of a voxel included in the set tracking processing area and image information of a voxel included in the tracking start area; and a fiber structure information obtainer that obtains the fiber structure information according to the determined similarity.

The similarity determiner may include: a similarity obtainer that obtains a similarity between a diffusion direction of a voxel included in the tracking start area and a diffusion direction of a voxel included in the tracking processing area, as a scalar value; and a diffusion time obtainer that obtains first diffusion time, as an inverse number of the predetermined scalar value, wherein the first diffusion time includes a diffusion time of a substance diffusing from a voxel of the tracking start area to a voxel for which the scalar value is obtained.

The fiber structure information obtainer may include a controller, a time accumulator, and a mapper.

The controller may control the tracking start area setter to reset a tracking start area to include at least one voxel for which similarity is determined. The controller may control the tracking processing area setter to reset a tracking processing area that is adjacent to the reset tracking start area. The controller may control the similarity determiner to determine a similarity between diffusion directions of voxels respectively included in the reset tracking start area and the reset tracking processing area. The controller may control the diffusion time obtainer to obtain second diffusion time from the similarity that is determined in regard to the reset tracking start area.

The time accumulator may accumulate first diffusion time and second diffusion time.

The mapper may map the accumulated diffusion time to a voxel for which the second diffusion time is obtained.

The fiber structure information obtainer may further include a path extractor that extracts a path for which the accumulated diffusion time indicating the diffusion time of the substance diffusing from the initially set tracking start area to each voxel is the smallest, by using the obtained diffusion time of each voxel.

According to another aspect of an exemplary embodiment, there is provided a computer-readable recording medium having embodied thereon a program for executing the method described above.

BRIEF DESCRIPTION OF THE DRAWINGS

The above and/or other aspects will become more apparent by describing certain exemplary embodiments, with reference to the accompanying drawings, in which:

FIGS. 10A and 10B illustrate a comparison of fiber structure information of an object acquired according to the related art and fiber structure information of an object that may be acquired according to an exemplary embodiment;

DETAILED DESCRIPTION

Figure 1:
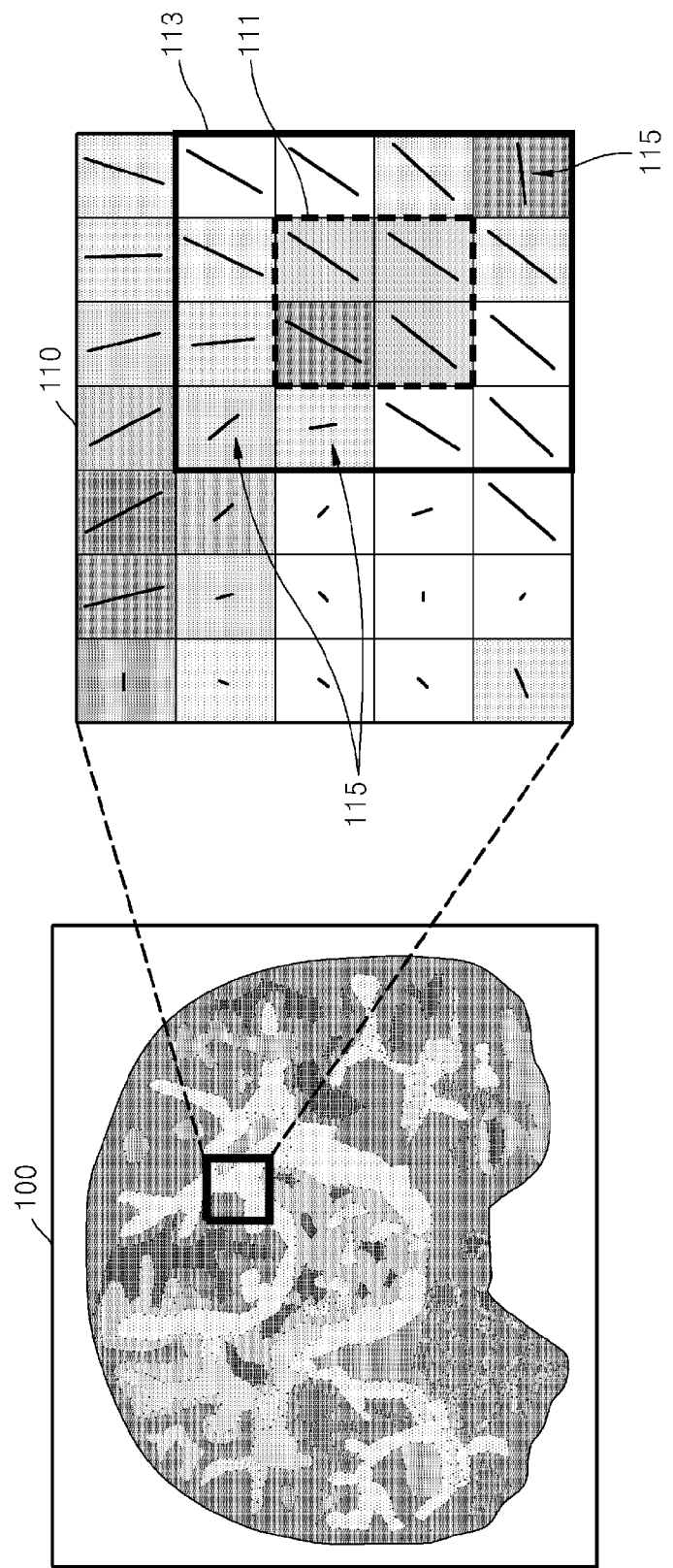
FIG. 1 illustrates acquisition of direction similarity information of voxels regarding an object according to the related art.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

The terms used in the present specification are used for explaining exemplary embodiments, and not limiting. Thus, the expression of singularity in the present specification includes the expression of plurality unless clearly specified otherwise in context. Unless defined otherwise, all terms used herein including technical or scientific terms have the same meanings as those generally understood by those skilled in the art to which the present inventive concept may pertain. The terms as those defined in generally used dictionaries are construed to have meanings matching that in the context of related technology and, unless clearly defined otherwise, are not construed to be ideally or excessively formal.

When a part may include a certain element, unless specified otherwise, it may not be construed to exclude another element but may be construed to further include other elements.

Expressions such as at least one of, when preceding a list of elements, modify the entire list of elements and do not modify the individual elements of the list.

Throughout the specification, an MRI refers to the imaging of an object that is performed via nuclear magnetic resonance.

Throughout the specification, a user may refer to a medical specialist, such as a doctor, nursing staff, a clinical pathologist, or a medical imaging specialist, but it is not limited thereto.

Throughout the specification, a target or an object may refer to a part of a body. For example, the target or the object may be an organ such as the liver, the heart, the uterus, the brain, a breast, or the stomach.

Also, a target or an object according to an exemplary embodiment may include a phantom having a highly approximate volume to a density of an organism and an effective atomic number; a phantom according to an exemplary embodiment may include a sphere-shaped phantom that has similar properties to those of a body.

In brain research, it is required to accurately track white matter nerve fibers to accurately find out the distribution of the white matter nerve fibers in the brain.

According to the related art, a line propagation nerve fiber tracking method and an energy minimization nerve fiber tracking method are used as a technique of tracking a nerve fiber of white matter based on DTIs.

According to the line propagation nerve fiber tracking method, a nerve fiber is tracked by selecting voxels of an image with which nerve fiber tracking is to be started and detecting voxels that are disposed in a direction of a diffusion tensor acquired regarding the selected voxels, and connecting the detected voxels along a direction of a diffusion tensor obtained from the detected voxels.

In the line propagation nerve fiber tracking method, a predetermined reference fractional anisotropy (FA) value and a predetermined reference angle, which is used to prevent an abrupt bending when a nerve fiber is being tracked, may be set in advance and used as tracking terminal conditions. For example, when a line that is generated by tracking adjacent voxels meets a voxel including a reference FA value or a reference angle, nerve fiber tracking is stopped.

Also, as a technique of nerve fiber tracking according to the related art, the energy minimization nerve fiber tracking method may be used. In the energy minimization nerve fiber tracking method, the concept that when ink, etc. is dropped into water, each ink molecule is diffused at different speeds in the water is used.

For example, according to the energy minimization nerve fiber tracking method, a degree that molecules in an object are diffused may be mapped to each voxel as a scalar value, and a path of a nerve fiber is tracked such that energy consumed for diffusion regarding the voxels, to which scalar values are mapped, is the smallest is tracked.

Compared to the line propagation nerve fiber tracking method, according to the energy minimization nerve fiber tracking method, a divergent fiber or an agglutinative fiber, which are generated as at least two nerve fibers having different main directions pass a single voxel, may be distinguished relatively accurately. Also, according to the energy minimization nerve fiber tracking method, a nerve fiber may be extracted by mapping of scalar values and a minimum value calculation by using the mapped values, and accordingly, an object is relatively less sensitive to noise in a captured image.

An example of the energy minimization nerve fiber tracking method is a fast marching tractography (FMT) method.

The FMT method may be performed in the following stages: An area where nerve fiber tracking is to be started is set, and then, a similarity between a diffusion tensor of the set start area and diffusion tensors of peripheral voxels is calculated. The calculated similarity is mapped to each peripheral voxel around the set start area, and an inverse number of the similarity is taken to generate a time map that indicates time needed for diffusing molecules of an object from the peripheral voxels to the set start area. A nerve fiber may be tracked by tracking a minimum time movement path that requires a minimum arrival time from peripheral voxels to the set start area by using the generated time map.

However, according to the FMT method of the related art, the similarity of all peripheral voxels around the start area is determined, and thus, a long time is required in tracking a nerve fiber or the like in an object. Moreover, as structural characteristics of a nerve fiber may not be reflected in the method, the accuracy of nerve fiber tracking may be low.

According to an exemplary embodiment, the time for searching may be reduced by limiting a range of a search area with respect to a start area when determining the similarity between voxels for nerve fiber tracking, and a probability that the selection of voxels with a high similarity from among found voxels, which would have existed if the range of the search area is not limited as in the related art, may be removed. In addition, when determining a similarity between voxels, object relevant information is considered to distinguish divergent fibers or agglutinative fibers more accurately. The object relevant information may include at least one of information related to white matter (WM) in an object (e.g., white matter probability map) and information indicating a degree of diffusion of a substance in the object (e.g., an FA value).

FIG. 1 illustrates direction similarity information of voxels acquired for an object according to the related art.

A tracking start area 111 for detecting an internal structure of an object may be set in a DTI 100 of the object. For convenience of description, a DTI 100 of a predetermined area 110 of the DTI 100 of the object is introduced.

According to the related art, the similarity between diffusion directions is determined with respect to all peripheral voxels of the tracking start area 111 that includes at least one voxel. For example, a tracking search area 113, including voxels around the tracking start area 111, may be set. In this case, an unnecessary time may be needed in that the similarity of voxels 115 that are in a different direction from a main direction of voxels in the tracking start area 111 also has to be determined. Also, when the similarity of the voxels 115 in a direction different from the main direction of the voxels in the tracking start area 111 is once set as in the related art, a high similarity may not be mapped to each of the voxels as when an operation of determining similarity is repeated.

In addition, according to the related art, as only a DTI is used without considering object relevant information that includes basic structural information of an object, the related art may be sensitive to noise, which may be included when determining the similarity between voxels.

Figure 2:
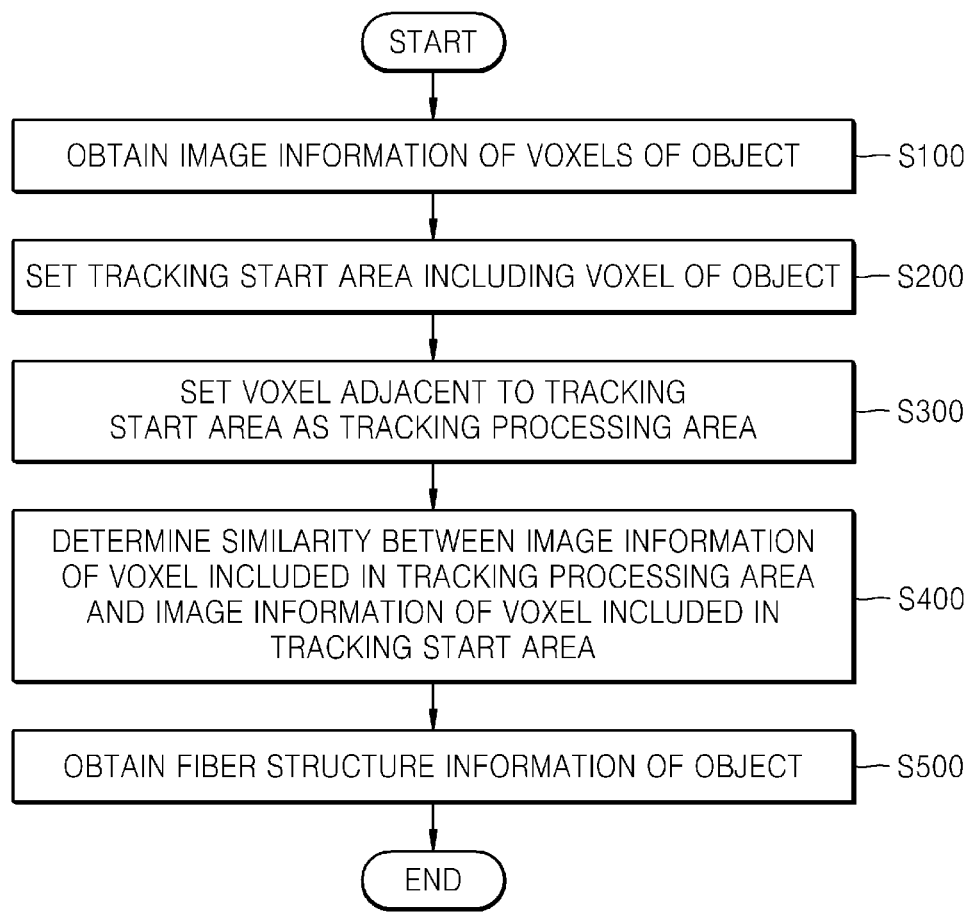
FIG. 2 is a flowchart illustrating a method of acquiring fiber structure information of a nerve fiber in an object, by using an MRI system, according to an exemplary embodiment.

FIG. 2 is a flowchart illustrating a method of acquiring fiber structure information of a nerve fiber in an object, by using an MRI system, according to an exemplary embodiment.

The method of acquiring fiber structure information of a nerve fiber in an object by using an MRI system may include: obtaining image information of each voxel of an object (operation S100); setting a tracking start area including at least one voxel of the object (operation S200); setting at least one voxel adjacent to the tracking start area, as a tracking processing area, according to a criteria set or predetermined standards (operation S300); determining a similarity between image information of voxels included in the set tracking processing area and image information of voxels included in the tracking start area (operation S400); and obtaining fiber structure information according to the determined similarity (operation S500).

Image information of each voxel acquired regarding an object according to the current exemplary embodiment may include diffusion direction information that is obtained from DTI of the object.

FIGS. 3A to 3D illustrate determining the similarity between image information of voxels of an object, according to an exemplary embodiment.

The predetermined standards according to the current exemplary embodiment may include diffusion directivity of a tracking start area 111. The diffusion directivity of the tracking start area may refer to a main directivity of at least one voxel that is included in the tracking start area 111.

Figure 3A:
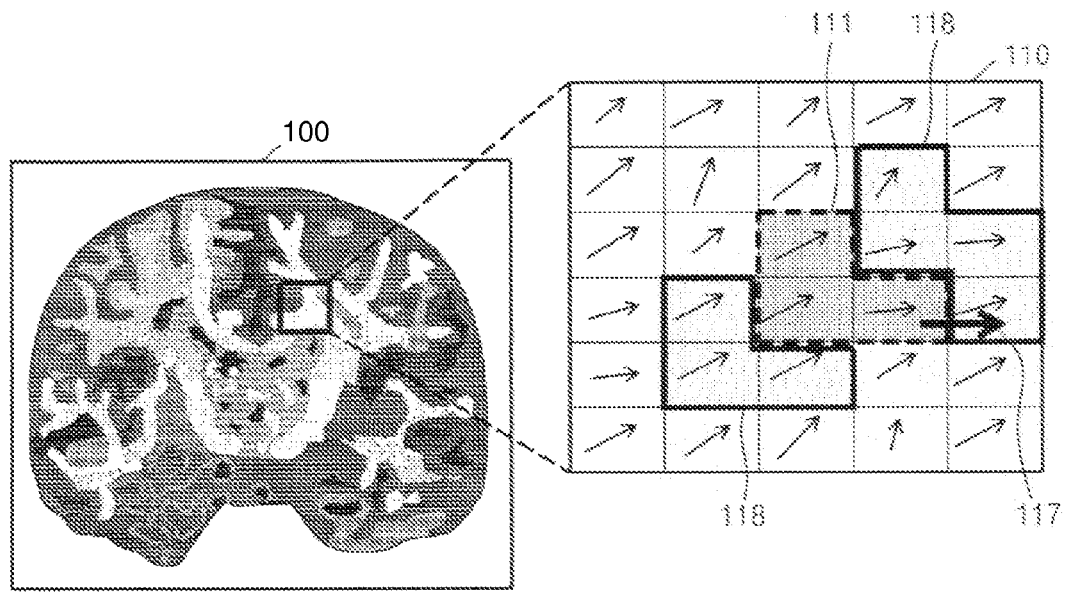
FIGS. 3A, 3B, 3C, and 3D illustrate determining the similarity between pieces of image information of voxels of an object, according to an exemplary embodiment.
Figure 3B:
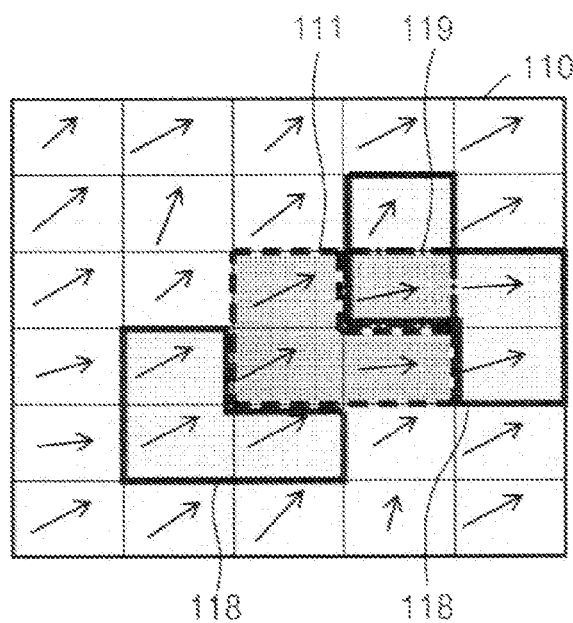
Figure 3C:
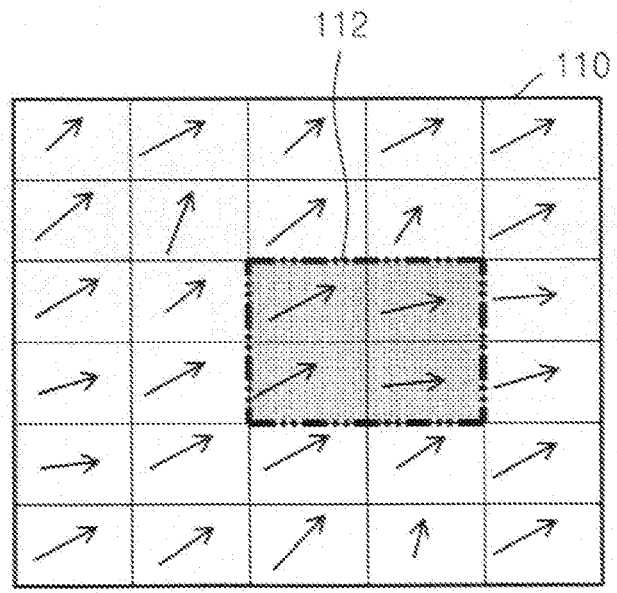

For example, as illustrated in FIG. 3A, a diffusion directivity of the tracking start area 111 may be in a diagonal direction toward the upper right side, which may be a directivity of the tracking start area 111. A tracking processing area 118 may be set according to the directivity of the tracking start area 111.

An operation of setting the tracking processing area 118 according to the current exemplary embodiment may include setting at least one voxel located along a diffusion direction of the tracking start area 111, as the tracking processing area 118.

For example, at least one voxel that is located along a diffusion direction 117 of the tracking start area 111, as illustrated in FIG. 3A, may be set as the tracking processing area 118. According to the current exemplary embodiment, the similarity of voxels that are in a direction different from the tracking start area 111 or not located along the diffusion direction 117 of the tracking start area 111 is not necessary to determine the similarity, and thus, the time for analyzing similarity to detect a nerve fiber structure in an object may be reduced compared to the related art, and a probability of mapping similarity with respect to other voxels is available.

The predetermined standards according to the current exemplary embodiment may include a predetermined range of angles formed by the diffusion direction 117 of the tracking start area 111 and a diffusion direction of at least one voxel that is adjacent to the tracking start area 111.

For example, at least one voxel, regarding which an angle formed by the diffusion direction 117 of the tracking start area 111 and a diffusion direction thereof, which is adjacent to the tracking start area 111, is included in a predetermined range, may be set as a tracking processing area. The range of the angle may be, for example, from 0° to less than 90°, but it is not limited thereto.

When the tracking processing area 118 is determined to be adjacent to the tracking start area 111 according to the predetermined standards, image information of a voxel included in the tracking start area 111 and image information of a voxel included in the tracking processing area 118 may be compared to determine a similarity of the image information of the voxels.

For example, image information of a voxel according to an exemplary embodiment may include a diffusion directivity of a voxel, and a similarity in diffusion directions may be determined by comparing a diffusion direction of a voxel of the tracking start area 111 and a diffusion direction of a voxel of the tracking processing area 118, as further described in detail with reference to FIGS. 4 through 6 below.

Figure 4:
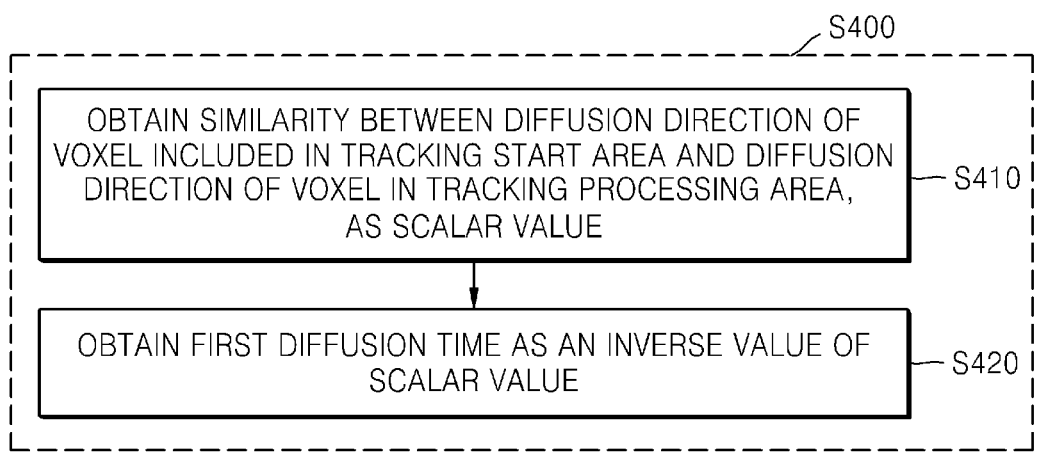
FIG. 4 illustrates an operation of determining the similarity between image information of a voxel of a tracking processing area and image information of a voxel of a tracking start area, according to an exemplary embodiment.

FIG. 4 illustrates operation S400 of determining the similarity between image information of a voxel of a tracking processing area and image information of a voxel of a tracking start area, according to an exemplary embodiment.

Operation S400 of determining the similarity between image information of a voxel of a tracking processing area and image information of a voxel of a tracking start area may include obtaining a similarity between a diffusion direction of a voxel included in the tracking start area and a diffusion direction of a voxel in the tracking processing area, as a scalar value (operation S410) and obtaining first diffusion time indicating the time needed for a substance of an object, such as water molecules ($H_2O$), to diffuse from a voxel of a tracking start area to a voxel for which the above scalar value is obtained, as an inverse number of the scalar value (operation S420).

Operation S410 of obtaining a similarity of a diffusion direction of a voxel included in a tracking start area and a diffusion direction of a voxel in a tracking processing area, as a scalar value, may include obtaining a scalar value by inner product calculation of a main diffusion direction of the tracking start area 111 and a diffusion direction of at least one voxel included in the tracking processing area 118.

Figure 5A:
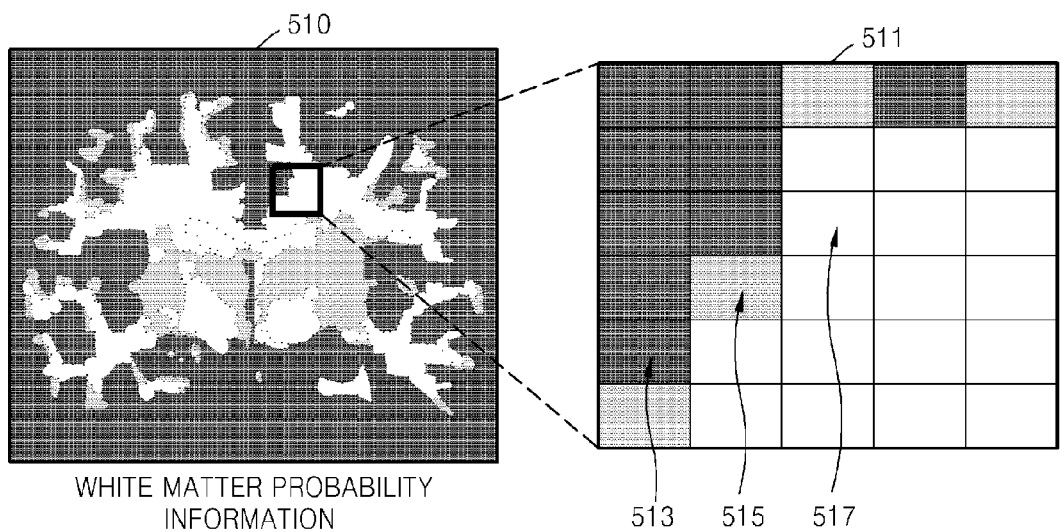
FIGS. 5A and 5B illustrate white matter probability information and fractional anisotropy (FA) information that may be acquired regarding an object.
Figure 5B:
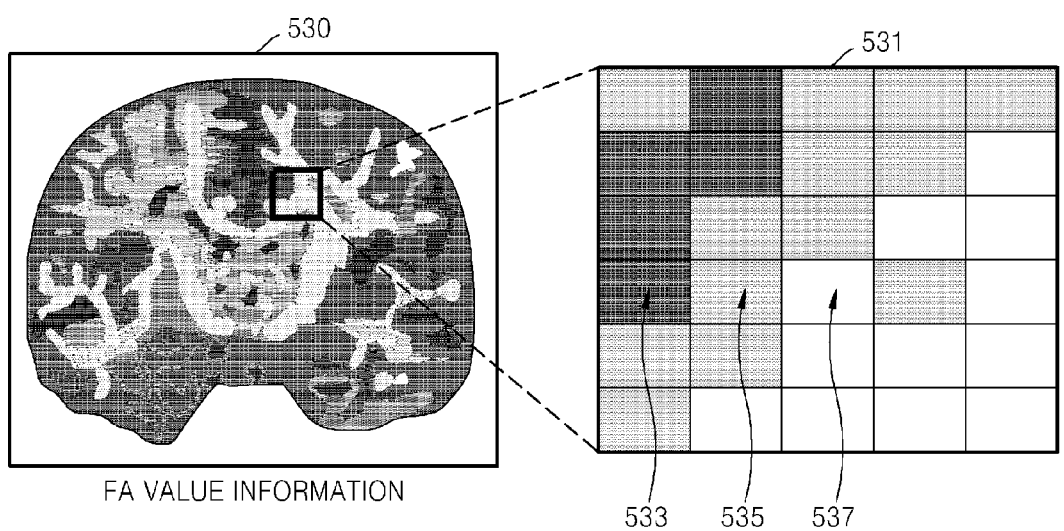

FIGS. 5A and 5B illustrate a map of white matter probability information 510 and a map of FA value information 530 that may be acquired regarding an object.

A similarity between image information of voxels according to the current exemplary embodiment may be weighted by using at least one of white matter probability information and an FA value of an object and obtained as a scalar value.

According to the current exemplary embodiment, white matter probability information of each voxel may be weighted to determine a similarity between image information of a voxel included in a tracking processing area and image information of a voxel of a tracking start area.

For example, as illustrated in FIG. 5A, white matter probability information in an area 511 may be expressed by a white voxel 517 if a corresponding voxel denotes white matter or a relatively high value (e.g., 0.7, 0.8, or 0.9) may be expressed on the voxel. On the other hand, if a corresponding voxel is not white matter, the voxel may be expressed as a black voxel 513 or a relatively low value (e.g., 0, 0.1, or 0.2) may be expressed on the voxel.

The higher the probability that a corresponding voxel is white matter, the voxel may be expressed to be gradually brighter in an order of a black voxel 513, a grey voxel 515, and a white matter voxel 517. The higher the probability that a corresponding voxel is white matter, a higher probability value may be expressed on the voxel.

For example, the white matter probability information may be weighted by being added to or multiplied by a similarity between a diffusion direction of a voxel included in a tracking start area and a diffusion direction of a voxel included in a tracking processing area, but it is not limited thereto.

For example, when the white matter voxel 517 is included in the tracking processing area, the similarity of a diffusion direction of the voxel included in the tracking start area and of a diffusion direction of the white matter voxel 517 may be higher than a similarity of the case when the white matter probability information 510 is not considered.

In other words, the similarity between image information of a voxel of a tracking start area and image information of a voxel of a tracking processing area may be obtained by adding or multiplying a white matter probability of a corresponding voxel to or by image information of a voxel of a tracking processing area.

In addition, according to the current exemplary embodiment, the similarity between image information of a voxel of a tracking start area and image information of a voxel of a tracking processing area may be obtained by weighting the FA value of the voxel included in the tracking processing area. FA denotes a degree of diffusion of a substance in an object, as a scalar value between 0 and 1.

For example, if FA is 0, it means that a substance in an object may diffuse in all directions. In other words, if FA is 0, a substance in an object diffuses in space limitlessly. For example, a diffusion direction of the substance in space may be expressed, for example, as a sphere.

If FA is 1, it means that a substance in an object may diffuse only along a predetermined axis. In other words, if FA is 1, it means that a diffusion direction of a substance in an object is limited to a predetermined direction. For example, a diffusion direction of a substance in space may be expressed as a bar that is placed along a predetermined axis.

As illustrated in FIG. 5B, if FA of a corresponding voxel is high, the voxel of an area 531 may be expressed as a white matter voxel 537 or a relatively high value (e.g., 0.7, 0.8, or 0.9) may be expressed on the voxel. On the other hand, if FA of a corresponding voxel is small (for example, if a substance may diffuse in all directions), the voxel may be expressed as a black voxel 533 or a relatively low value (e.g., 0, 0.1, or 0.2) may be expressed on the voxel.

In other words, as FA of a corresponding voxel increases, the voxel may be expressed to be gradually brighter in an order of a black voxel 533, a grey voxel 535, and a white matter voxel 537. The higher a probability that a corresponding voxel is white matter, a higher FA value may be expressed on the voxel.

According to the current exemplary embodiment, an FA of a voxel may be weighted by being added to or multiplied by a similarity between image information of a voxel included in a tracking start area and image information of a voxel included in a tracking processing area. For example, voxels having a high FA may be assumed as a substance having a relatively similar structure or characteristics and may be grouped in a similar substance group.

By using an FA of the voxel in determining a similarity of voxels, for example, accuracy in determining the similarity of directions of voxels may be increased. As described above, as the similarity between image information of voxels is obtained by weighting an FA of a voxel, characteristics such as accuracy of a voxel may be determined relatively accurately.

Also, according to the current exemplary embodiment, a similarity between image information of a voxel in a tracking start area and image information of a voxel in a tracking processing area may be obtained as a scalar value by weighting both white matter probability information and an FA of an object.

For example, both white matter probability information 510 denoting that a voxel is white matter and an FA 530 denoting diffusion directivity of a voxel may be added to or multiplied by each other to determine a similarity between pieces of image information of voxels. For example, if a voxel included in a tracking processing area is white matter and has a high FA, the similarity of image information of the voxel may be set to be relatively high compared to other voxels which are not white matter or which are included in a tracking processing area having a low FA value.

Figure 6:
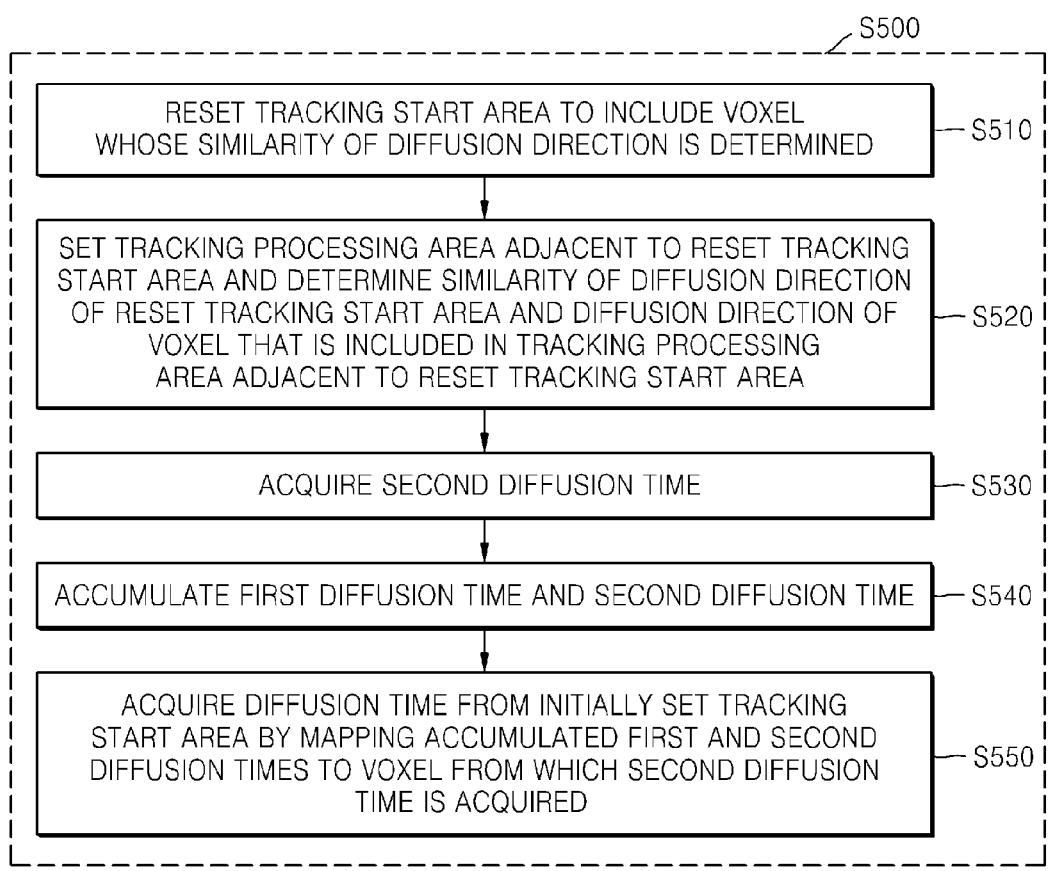
FIG. 6 illustrates an operation of acquiring fiber structure information of a nerve fiber in an object based on the determined similarity, according to an exemplary embodiment.

FIG. 6 illustrates an operation of acquiring fiber structure information of a nerve fiber in an object based on the determined similarity, according to an exemplary embodiment.

Figure 3D:
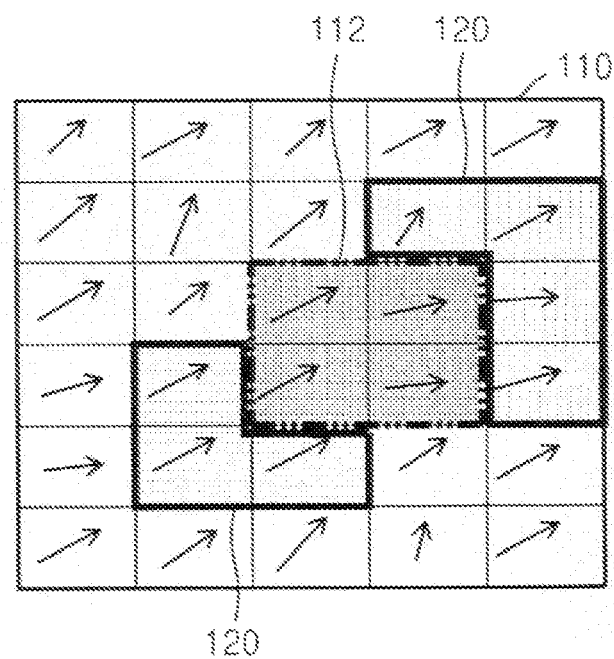

Operation S500 of acquiring fiber structure information of a nerve fiber in an object based on the determined similarity may include: resetting a tracking start area (indicated by reference numeral 112 in FIG. 3C) to include at least one voxel (indicated by reference numeral 119 in FIG. 3B) whose similarity of diffusion direction is determined (operation S510); determining a similarity of a diffusion direction of at least one voxel that is adjacent to the reset tracking start area and is included in the reset tracking processing area indicated by reference numeral 120 in FIG. 3D (operation S520); acquiring second diffusion time from the similarity determined in regard to the reset tracking start area (operation S530); accumulating the first diffusion time and the second diffusion time (operation S540); and acquiring diffusion time from an initially set tracking start area by mapping the accumulated first and second diffusion time to a voxel from which the second diffusion time is acquired (operation S550).

Fiber structure information of nerve fibers in an object according to the current exemplary embodiment may be obtained as a path for which the accumulated diffusion time indicating the time to diffuse from the initially set tracking start area to each voxel is the smallest, by using the obtained diffusion time of each voxel of an object. For example, fiber structure information of nerve fibers in the object may be obtained by gathering the at least one of voxel which has the smallest diffusion time from the initially set tracking start area. In other words, the fiber structure information may be obtained by selecting and combining the at least one of voxel having the smallest diffusion time. In this regard, an exemplary embodiment may be illustrated with reference to FIG. 10B.

Figure 7:
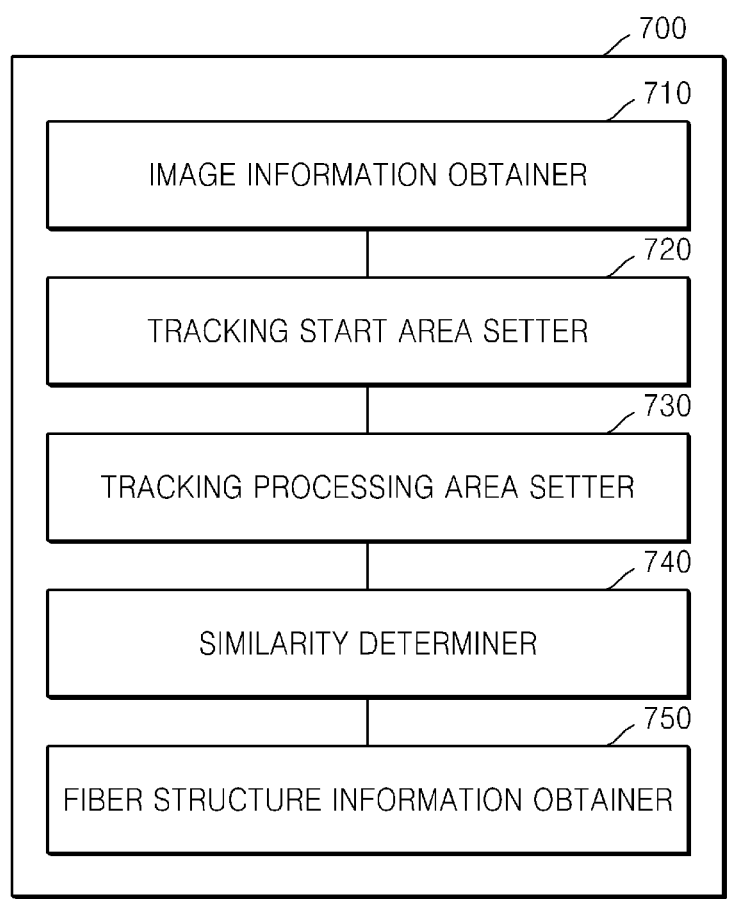
FIG. 7 is a schematic view of an apparatus for acquiring fiber structure information of a nerve fiber in an object by using an MRI system, according to an exemplary embodiment.

FIG. 7 is a schematic view of an apparatus 700 for acquiring fiber structure information of a nerve fiber in an object by using an MRI system, according to an exemplary embodiment.

The apparatus 700 for acquiring fiber structure information of a nerve fiber in an object by using an MRI system, according to the current exemplary embodiment, may include: an image information obtainer 710 that obtains image information of each voxel regarding an object; a tracking start area setter 720 that sets a tracking start area including at least one voxel of an object; a tracking processing area setter 730 that sets at least one voxel that is adjacent to the tracking start area, as a tracking processing area, according to predetermined standards; a similarity determiner 740 that determines a similarity between image information of a voxel included in the set tracking processing area and image information of a voxel included in the set tracking start area; and a fiber structure information obtainer 750 that obtains fiber structure information according to the determined similarity.

The obtained image information of each voxel of an object according to the current exemplary embodiment may include diffusion direction information that is obtained from a DTI of an object.

The predetermined standards according to the current exemplary embodiment may include, for example, diffusion directivity of a tracking start area. The tracking processing area setter 730 may set at least one voxel that is located along a diffusion direction of the tracking start area as a tracking processing area.

The predetermined standards according to the current exemplary embodiment may further include a range of an angle formed by the diffusion direction of the tracking start area and a diffusion direction of at least one voxel that is adjacent to the tracking start area.

Figure 8:
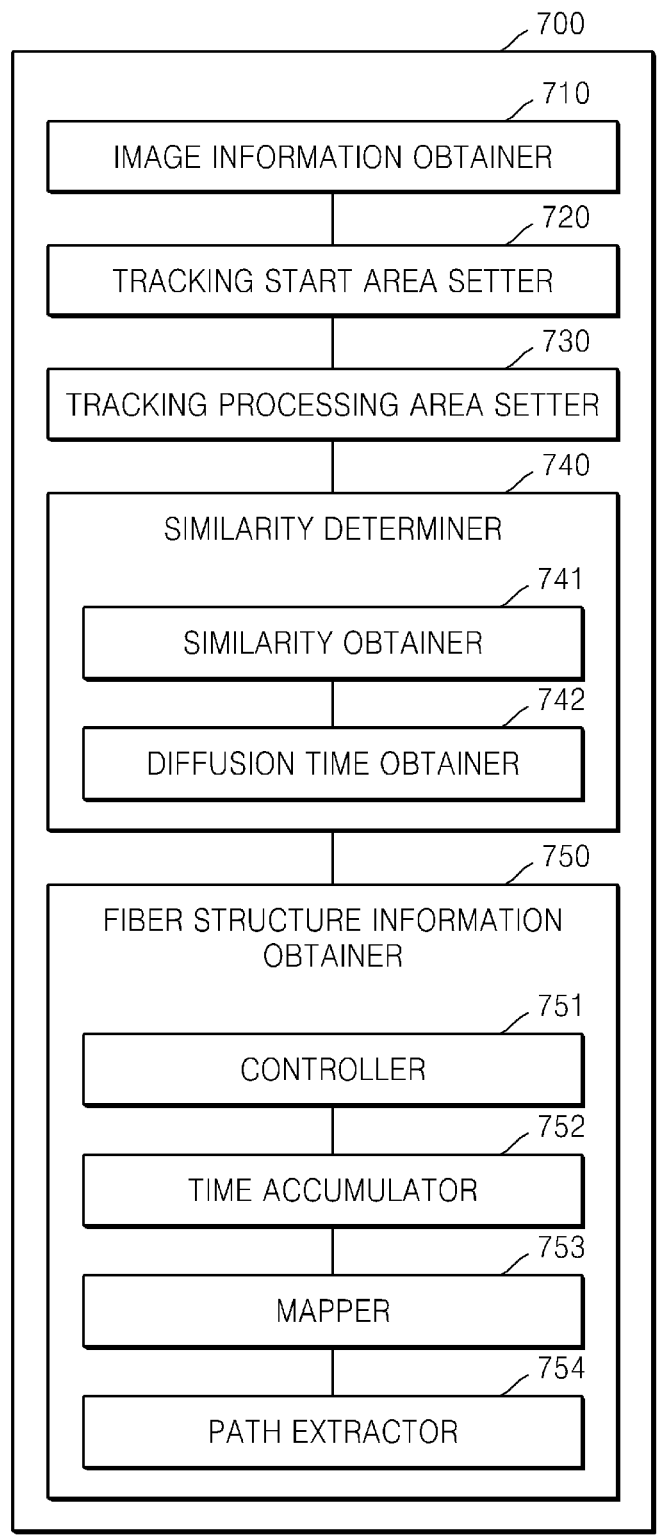
FIG. 8 illustrates the apparatus for acquiring fiber structure information of a nerve fiber in an object by using an MRI system in detail, according to an exemplary embodiment.

FIG. 8 illustrates the apparatus 700 for acquiring fiber structure information of nerve fiber in an object by using an MRI system in detail, according to an exemplary embodiment.

The similarity determiner 740 according to the current exemplary embodiment may include a similarity obtainer 741 that obtains a similarity between a diffusion direction of a voxel included in a tracking start area and a diffusion direction of a voxel included in a tracking processing area, as a scalar value and a diffusion time obtainer 742 that obtains first diffusion time indicating the time consumed for a substance of an object, such as water molecules ($H_2O$), to diffuse from a voxel of the tracking start area to a voxel for which the above scalar value is obtained, as an inverse number of a scalar value.

The similarity according to the current exemplary embodiment may be weighted by using at least one of white matter probability information and an FA value of an object and may be obtained as a scalar value.

The fiber structure information obtainer 750 according to the current exemplary embodiment may include a controller 751, a time accumulator 752, and a mapper 753.

The controller 751 may control the tracking start area setter 720 to reset a tracking start area to include at least one voxel, the similarity of which is determined. The controller 751 may control the tracking processing area setter 730 to reset a tracking processing area that is adjacent to the reset tracking start area. The controller 751 may control the similarity determiner 740 to determine a similarity between diffusion directions of voxels which are respectively included in the reset tracking start area and the reset tracking processing area.

The controller 751 may control the diffusion time obtainer 742 to obtain second diffusion time from the similarity that is determined in regard to the reset tracking start area.

The time accumulator 752 according to the current exemplary embodiment may accumulate first diffusion time and second diffusion time.

The mapper 753 according to the current exemplary embodiment may map the accumulated diffusion time to a voxel for which second diffusion time is obtained. By this mapping operation, a diffusion time, etc. from the tracking start area regarding each voxel may be displayed. In other words, the diffusion time displayed on each voxel may include the accumulated arrival time from the tracking start area to a corresponding voxel, as further described below with reference to FIG. 9.

The fiber structure information obtainer 750 that obtains fiber structure information of an object according to the current exemplary embodiment may further include a path extractor 754 that extracts a path for which accumulated diffusion time indicating the diffusion time of a substance diffusing from the initially set tracking start area to each voxel is the smallest, by using the obtained time of each voxel of the object.

Figure 9:
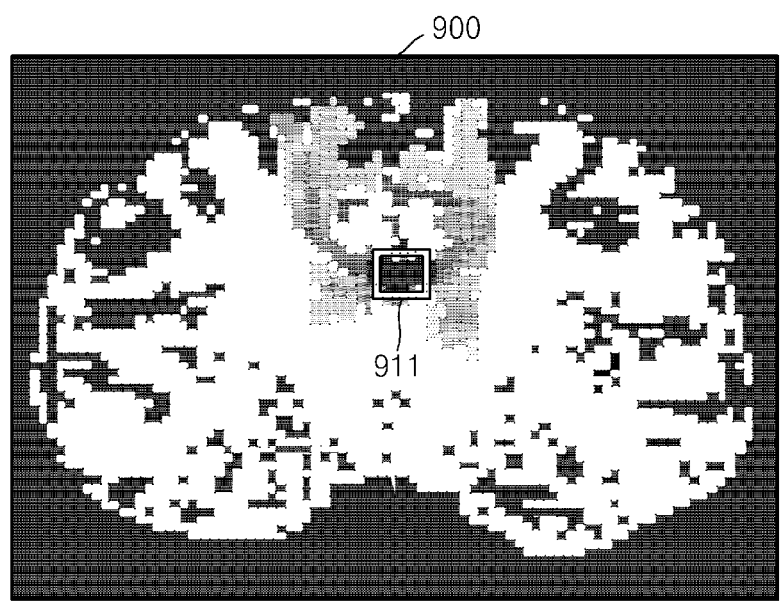
FIG. 9 illustrates fiber structure information of a nerve fiber in an object that may be acquired according to an exemplary embodiment.

FIG. 9 illustrates fiber structure information 900 of a nerve fiber in an object that may be acquired according to an exemplary embodiment.

The diffusion time 900 that is accumulated in each voxel by using the mapper 753 may be expressed to have different luminance values as illustrated in FIG. 9.

The diffusion time 900 may be expressed with various luminance values as diffusion time varies, starting from a point 911 that is set as a tracking start area. For example, a diffusion time indicating the time needed for substances such as water molecules ($H_2O$) to diffuse from an initial point 911 set as a tracking start area to a voxel that is near to the initial point 911 is relatively short, and thus, the voxel may be expressed in black, and the luminance of the voxel may be expressed to be gradually brighter away from the initial point 911, but an exemplary embodiment is not limited thereto.

FIGS. 10A and 10B illustrate a comparison of nerve fiber structure information acquired according to the related art and nerve fiber structure information that may be acquired according to an exemplary embodiment.

As shown in FIG. 10B, the nerve fiber structure information of an object according to the current exemplary embodiment expressed in more detail may be obtained as compared to the nerve fiber structure information obtained according to the related art (FIG. 10A).

For example, when extracting a nerve fiber of white matter according to an exemplary embodiment, if an object is a brain, divergent fibers or agglutinative fibers may be extracted more precisely as illustrated in areas 1100 of FIG. 10B than in the related art.

Figure 11:
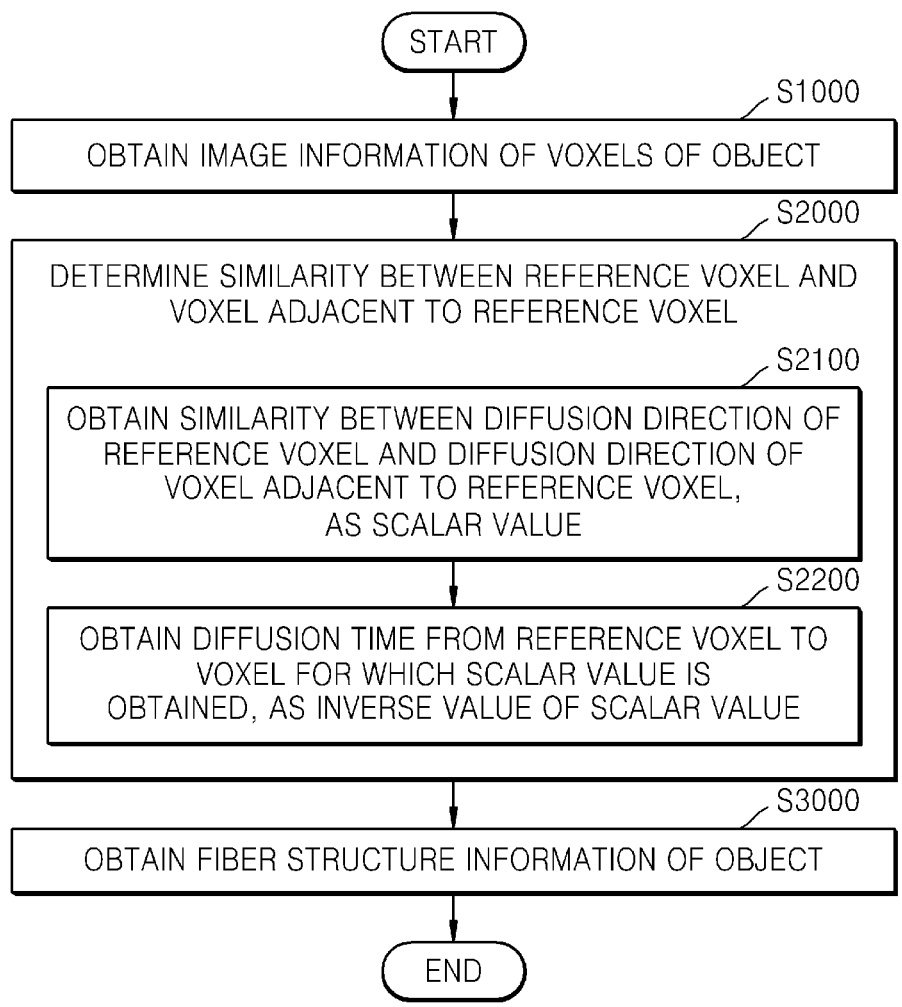
FIG. 11 is a flowchart illustrating a method of acquiring fiber structure information of a nerve fiber in an object by using an MRI system according to another exemplary embodiment.

FIG. 11 is a flowchart illustrating a method of acquiring fiber structure information of a nerve fiber in an object by using an MRI system, according to another exemplary embodiment.

The method of acquiring fiber structure information of a nerve fiber in an object by using an MRI system, according to the current exemplary embodiment, may include: operation S1000 of obtaining image information of each voxel of an object; operation S2000 of determining the similarity between a reference voxel and at least one voxel adjacent to the reference voxel; and operation S3000 of obtaining fiber structure information according to the determined similarity. The similarity may be weighted by using at least one of white matter probability information and an FA value of an object and may be determined as a scalar value.

The obtained image information of each voxel of an object according to an exemplary embodiment may include diffusion direction information obtained from a DTI of an object.

Operation S2000 of determining the similarity between a reference voxel and at least one voxel adjacent to the reference voxel may include: operation S2100 of obtaining a similarity between a diffusion direction of a reference voxel and a diffusion direction of at least one voxel adjacent to the reference voxel, as a scalar value; and operation S2200 of obtaining diffusion time indicating the diffusion time of substances such as water molecules ($H_2O$) diffusing from the reference voxel to a voxel for which the predetermined scalar value is obtained, as an inverse number of the predetermined scalar value.

The method of acquiring fiber structure information of a nerve fiber in an object by using an MRI system, according to the current exemplary embodiment, may include: obtaining diffusion time from a reference voxel, with respect to all voxels of an object. The diffusion time may include a diffusion time of substances diffusing from the reference voxel to a voxel for which the predetermined scalar value is obtained. For example, operation S2000 may be repeatedly performed with respect to all voxels of an object.

The fiber structure information according to the current exemplary embodiment may be obtained, by using the obtained diffusion time of each voxel, as a path for which the accumulated diffusion time indicating the time needed for substances such as water molecules ($H_2O$) to diffuse from the initially set tracking start area to each voxel is the smallest, by using the obtained diffusion time of each voxel of an object.

Figure 12:
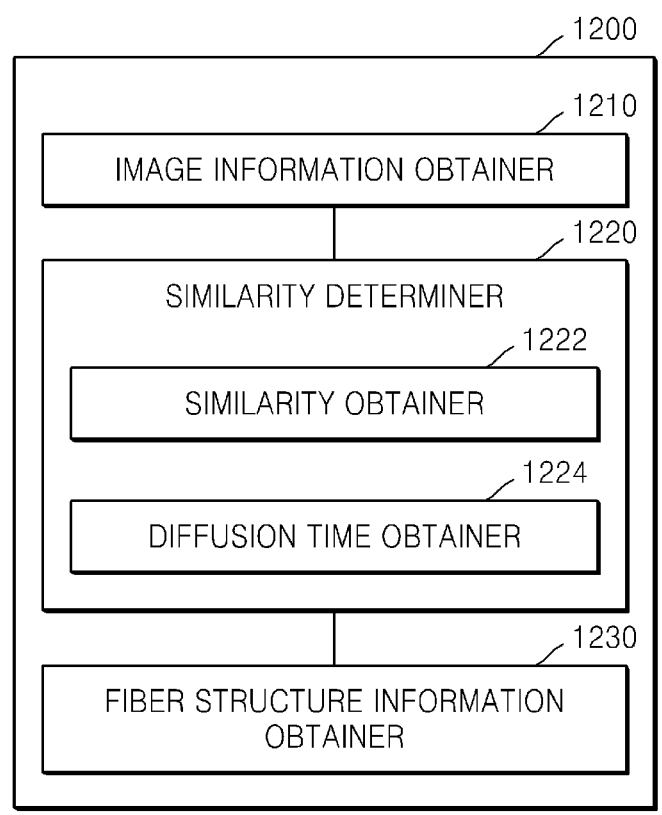
FIG. 12 illustrates an apparatus for acquiring fiber structure information of a nerve fiber in an object by using an MRI system according to another exemplary embodiment.

FIG. 12 illustrates an apparatus 1200 for acquiring fiber structure information of a nerve fiber in an object by using an MRI system, according to another exemplary embodiment.

The apparatus 1200 for acquiring fiber structure information of a nerve fiber in an object by using an MRI system, according to the current exemplary embodiment, may include: an image information obtainer 1210 that obtains image information of each voxel regarding an object; a similarity determiner 1220 that determines a similarity between a reference voxel and at least one voxel adjacent to the reference voxel; and a fiber structure information obtainer 1230 that obtains fiber structure information according to the determined similarity.

The similarity according to the current exemplary embodiment may be weighted by using at least one of probability white matter information regarding an object and FA value and determined as a scalar value.

The image information that is obtained regarding each voxel of an object according to the current exemplary embodiment may include diffusion direction information that is obtained from a DTI of an object.

The similarity determiner 1220 according to the current exemplary embodiment may further include a similarity obtainer 1222 that obtains a similarity between a diffusion direction of a reference voxel and at least one voxel that is adjacent to the reference voxel, as a scalar value, and a diffusion time obtainer 1224 that obtains diffusion time indicating the time needed for substances such as water molecules ($H_2O$) to diffuse from the reference voxel to a voxel for which a scalar value is obtained, as an inverse number of the predetermined scalar value.

The diffusion time obtainer 1230 may obtain diffusion time regarding all voxels of an object, from the reference voxel.

The fiber structure information according to the current exemplary embodiment may be obtained by using the fiber structure information obtainer 1230, as a path for which the accumulated diffusion time indicating the time needed for substances such as water molecules ($H_2O$) to diffuse from the initially set tracking start area to each voxel is the smallest, by using the obtained diffusion time of each voxel of an object.

The description related to the above-described method may be applied to an apparatus according to an exemplary embodiment. Thus, the repeated descriptions are omitted here.

The exemplary embodiments can be written as computer programs that can be implemented in general-use computers that execute the programs using a computer-readable recording medium.

Examples of the computer-readable recording medium include read-only memory (ROM), random-access memory (RAM), CD-ROMs, magnetic tapes, floppy disks, optical data storage devices, etc. (e.g., transmission through the Internet).

Although a few exemplary embodiments have been shown and described, exemplary embodiments are not limited thereto. It would be appreciated by those skilled in the art that changes may be made in these exemplary embodiments without departing from the principles and spirit of the disclosure, the scope of which is defined in the claims and their equivalents.

What is claimed is:

1. A method of obtaining fiber structure information of a nerve fiber in an object, the method comprising:
    obtaining image information of voxels of the object;
    setting a tracking start area including one or more of first voxels;
    setting a tracking processing area to include one or more of second voxels, which are adjacent to the tracking start area, based on a criteria;
    determining similarity between image information of the second voxels and the first voxels; and
    obtaining the fiber structure information according to the determined similarity,
    wherein the similarity comprises diffusion direction similarity between diffusion directions of the first voxels and the second voxels, and the fiber structure information is obtained according to a first diffusion time obtained based on the diffusion direction similarity, the first diffusion time including a time of a substance diffusing from the first voxels to the second voxels.

2. The method of claim 1, wherein the obtaining the image information comprises obtaining diffusion direction information from diffusion tensor image (DTI) of the object.

3. The method of claim 1, wherein the criteria comprises a first diffusion direction which substantially coincides with a diffusion directivity of the tracking start area, and
    the setting the tracking processing area comprises setting the tracking processing area to include the second voxels which have second diffusion directions located along the first diffusion direction.

4. The method of claim 3, wherein the criteria further comprises a range of angles between the first diffusion direction and the second diffusion directions of the second voxels.

5. The method of claim 1, wherein the determining the similarity comprises:
    obtaining the diffusion direction similarity between the diffusion directions of the first voxels and the second voxels, as a scalar value; and
    obtaining the first diffusion time as an inverse value of the scalar value.

6. The method of claim 5, wherein the obtaining the fiber structure information comprises:
    resetting the tracking start area to include at least one of the second voxels whose the diffusion direction similarity is determined;
    resetting the tracking processing area to include a third voxel, which is adjacent to the reset tracking start area;
    determining diffusion direction similarity between diffusion directions of the third voxel and the at least one of the second voxels;
    acquiring a second diffusion time based on the diffusion direction similarity determined in regard to the reset tracking start area;
    accumulating the first diffusion time and the second diffusion time; and
    acquiring a total diffusion time by mapping the accumulated time to the third voxel,
    wherein the total diffusion time comprises a time of a substance diffusing from the first voxels of the tracking start area to the third voxel.

7. The method of claim 6, wherein the fiber structure information is obtained as a path for which the total diffusion time indicating the time of the substance diffusing from the first voxels of the tracking start area to each of the second and the third voxels is the smallest.

8. The method of claim 1, wherein the similarity is weighted by using at least one of white matter probability information and a fractional anisotropy (FA) value of the object, and is expressed as a scalar value.

9. An apparatus for acquiring fiber structure information of a nerve fiber in an object, the apparatus comprising:
one or more processors configured to:
obtain image information of voxels of the object;
set a tracking start area including one or more of first voxels;
set a tracking processing area to include one or more of second voxels, which are adjacent to the tracking start area, based on a criteria;
determine similarity between image information of the second voxels and the first voxels; and
obtain the fiber structure information according to the determined similarity,
wherein the similarity comprises diffusion direction similarity between diffusion directions of the first voxels and the second voxels, and the fiber structure information is obtained according to a first diffusion time obtained based on the diffusion direction similarity, the first diffusion time including a time of a substance diffusing from the first voxels to the second voxels.

10. The apparatus of claim 9, wherein the obtained image information includes diffusion direction information that is obtained from a diffusion tensor image (DTI) of the object.

11. The apparatus of claim 9, wherein the criteria comprises a first diffusion direction which substantially coincides with a diffusion directivity of the tracking start area, and
the one or more processors are configured to set the tracking processing area to include the second voxels which have second diffusion directions located along the first diffusion direction.

12. The apparatus of claim 11, wherein the criteria further comprises a range of angles between the first diffusion direction and the second diffusion directions of the second voxels.

13. The apparatus of claim 9, wherein the one or more processors are further configured to:
obtain the diffusion direction similarity between the diffusion directions of the first voxels and the second voxels, as a scalar value; and
obtain the first diffusion time as an inverse value of the scalar value.

14. The apparatus of claim 13, wherein the one or more processors are further configured to:
reset the tracking start area to include at least one of the second voxels whose the diffusion direction similarity is determined;
reset the tracking processing area to include a third voxel, which is adjacent to the reset tracking start area;
determine diffusion direction similarity between diffusion directions of the third voxel and the at least one of the second voxels;
obtain a second diffusion time based on the diffusion direction similarity determined in regard to the reset tracking start area;
accumulate the first diffusion time and the second diffusion time; and
map the accumulated diffusion time to the third voxel.

15. The apparatus of claim 14, wherein the one or more processors are further configured to extract a path for which the accumulated diffusion time indicating the time of the substance diffusing from the first voxels of the tracking start area to each of the second and the third voxels is the smallest.

16. The apparatus of claim 9, wherein the similarity is weighted by using at least one of white matter probability information and a fractional anisotropy (FA) value of the object, and is expressed as a scalar value.

17. A non-transitory computer-readable recording medium having recorded thereon a program which, when executed by a computer, causes the computer to execute the method of claim 1.

18. A method of obtaining fiber structure information of a nerve fiber in an object, the method comprising:
obtaining image information of voxels of the object;
determining similarity between a reference voxel and one or more of adjacent voxels adjacent to the reference voxel; and
obtaining fiber structure information according to the determined similarity,
wherein the similarity is weighted by using at least one of white matter probability information and a fractional anisotropy (FA) value of the object, and is expressed as a scalar value, and the similarity comprises diffusion direction similarity between diffusion directions of the reference voxel and the adjacent voxels, and the fiber structure information is obtained according to a diffusion time obtained based on the diffusion direction similarity, the diffusion time including a time of a substance diffusing from the reference voxel to the one of the adjacent voxels.

19. The method of claim 18, wherein the obtained image information comprises diffusion direction information obtained from diffusion tensor image (DTI) of the object.

20. The method of claim 18, wherein the determining the similarity comprises:
obtaining the diffusion direction similarity between the diffusion directions of the reference voxel and the adjacent voxels, as a scalar value; and
obtaining a diffusion time as an inverse value of the scalar value,
wherein the diffusion time comprises a time of a substance diffusing from the reference voxel to the one of the adjacent voxels.

21. The method of claim 20, further comprising obtaining diffusion times from the reference voxel to each of the adjacent voxels,
wherein the fiber structure information is obtained as a path for which an accumulated diffusion time indicating the time of the substance diffusing from the reference voxel to the each of the adjacent voxels is the smallest, by using the obtained diffusion time from the reference voxel to the each of the adjacent voxels.

22. An apparatus for acquiring fiber structure information of a nerve fiber in an object, the apparatus comprising:
one or more processors configured to:
obtain image information of voxels of the object;
determine similarity between a reference voxel and one or more adjacent voxels adjacent to the reference voxel; and
obtain the fiber structure information according to the determined similarity,
wherein the similarity is weighted by using at least one of white matter probability information and a fractional anisotropy (FA) value of the object and is obtained as a scalar value, and the similarity comprises diffusion direction similarity between diffusion directions of the reference voxel and the adjacent voxels, and the fiber structure information is obtained according to a diffusion time obtained based on the diffusion direction similarity, the diffusion time including a time of a substance diffusing from the reference voxel to the one of the adjacent voxels.

23. The apparatus of claim 22, wherein the obtained image information comprises diffusion direction information that is obtained from diffusion tensor image (DTI) of the object.

24. The apparatus of claim 22, wherein the one or more processors are further configured to:
- obtain the diffusion direction similarity between the diffusion directions of the reference voxel and the adjacent voxels, as a scalar value; and
- obtain the diffusion time, as an inverse value of the scalar value.

25. The apparatus of claim 24, wherein the one or more processors are further configured to obtain diffusion times from the reference voxel to each of the adjacent voxels, and
- the fiber structure information is obtained as a path for which an accumulated diffusion time indicating the time of the substance diffusing from the reference voxel to the each of the adjacent voxels is the smallest, by using the obtained diffusion time from the reference voxel to the each of the adjacent voxels.

* * * * *